United States Patent [19]

Hendrix

[11] Patent Number: 5,026,099
[45] Date of Patent: Jun. 25, 1991

[54] DRY BREAK COUPLER WITH RING COLLAR SLEEVE OPERATOR

[75] Inventor: Raymond R. Hendrix, Magnolia, Ohio

[73] Assignee: BP America Inc., Cleveland, Ohio

[21] Appl. No.: 486,391

[22] Filed: Feb. 28, 1990

[51] Int. Cl.⁵ .............................................. F16L 37/05
[52] U.S. Cl. .................................... 285/315; 285/314; 285/311; 285/313; 285/308; 285/38; 285/87; 285/277
[58] Field of Search ................... 285/38, 87, 277, 311, 285/313, 314, 315, 326, 308

[56] References Cited

U.S. PATENT DOCUMENTS

| | | | |
|---|---|---|---|
| 1,143,136 | 6/1915 | Relitz | 285/311 |
| 1,168,068 | 1/1916 | Harrison | 285/38 |
| 1,916,284 | 3/1931 | Ragan | 285/314 X |
| 2,525,086 | 10/1950 | Wright et al. | 173/326 |
| 4,133,347 | 1/1979 | Mercer | 285/62 X |
| 4,156,551 | 5/1979 | Nagase et al. | 339/15 |
| 4,183,599 | 1/1980 | Wetzig | 339/15 |

OTHER PUBLICATIONS

Emco Wheaton Inc., Catalog Pages and Drawings Publication Date Unknown.

Primary Examiner—Randolph A. Reese
Assistant Examiner—Tim Aberle
Attorney, Agent, or Firm—Larry Evans; David J. Untener; Michael F. Esposito

[57] ABSTRACT

A quick disconnect coupler comprising a coupler body, a latching mechanism for holding the coupler body to another component, a telescoping sleeve moveable axially on the coupler body to engage and disengage the latching mechanism, and a sleeve operator assembly for moving the telescoping sleeve axially between engaged and disengaged positions. The sleeve operator assembly includes a yoke in the form of a ring collar having opposite ends and opposite side portions straddling the telescoping sleeve. Opposite side portions of the yoke are pivotally connected to respective sides of the telescoping sleeve at diametrically opposite connection points. A handle is provided at one end of the yoke, and a linkage connects the other end of the yoke to the coupler body.

14 Claims, 2 Drawing Sheets

DRY BREAK COUPLER WITH RING COLLAR SLEEVE OPERATOR

The invention herein described relates generally to dry break couplers and the like employing locking sleeves and more particularly to an anti-cocking device attached to the dry break for operating the locking sleeve.

BACKGROUND OF THE INVENTION

Dry break couplers and mating adapters are commonly used to provide for quick coupling and decoupling of fluid conduits with no or minimal fluid spillage. A common dry break coupler includes a valve body and a locking sleeve. The locking sleeve is telescoped over the valve body and is movable axially between disengaged and engaged positions. When the locking sleeve is in its disengaged position, latching dogs in the valve body are free to move radially to permit mating of the valve body with an adapter. The locking sleeve then can be moved forwardly to its engaged position to hold the latching dogs in latched engagement with the adapter to prevent separation of the dry break coupler and adapter. With the coupler thusly coupled to the adapter, a lever on the valve body can be rotated to open a poppet valve in the valve body to establish fluid communication between flow passages in the coupler and adapter. When the lever is thusly rotated, a cam surface on the lever moves to a position blocking rearward movement of the locking sleeve out of its engaged position thereby to prevent decoupling of the coupler and adapter when the poppet valve is open.

In the petroleum transport industry dry break couplers have been used on the ends of loading arms for coupling to bottom loading adapters on rolling stock such as tank trucks. In the case of a truck terminal where petroleum product is loaded into tank trucks, an operator would typically manually maneuver the dry break coupler into alignment with the adapter at the bottom of the truck and then push the coupler into mating engagement with the adapter. Once mated, the locking sleeve is pushed from its disengaged to its engaged position To facilitate pushing of the locking sleeve, a common dry break coupler is provided with a pair of handles at diametrically opposite sides of the locking sleeve. An operator may grip these handles and push preferably with equal force against the handles to push the sleeve to its engaged position without cocking of sleeve.

Problems arise when an operator attempts to push the locking sleeve to its engaged position when the dry break coupler is not properly aligned with and mated with the adapter. If the coupler axis is skewed to the axis of the adapter, or if the coupler is otherwise not fully mated with the adapter, interference between the latching dogs and a latching flange on the adapter can prevent free movement of the locking sleeve from its disengaged position to its engaged position. When this occurs, an operator may then attempt to force the locking sleeve into its engaged position while continuing to attempt to move the coupler into proper alignment with the adapter. This is difficult to accomplish using the handles on the sleeve because of their location and lack of any leverage. Instead, operators have in the past grasped and rotated the poppet valve lever to use the cam surface on the lever to forcibly drive the sleeve to its engaged position. This results in increased wear and breakage of coupler components, particularly at the surface of locking sleeve against which the lever cam surface bears. When such wear has progressed to a point that the cam surface no longer will function to prevent retraction of the locking sleeve when the poppet valve is open, the locking sleeve must be repaired or replaced. Another part that is subject to premature failure is a pin that is typically used to connect the poppet valve lever to a shaft journalled in the valve body. Excessive forces applied to the lever during such camming of the locking sleeve to its engaged position cause the pin to break or bend.

SUMMARY OF THE INVENTION

The present invention provides an improvement in dry break couplers and the like which greatly facilitates coupling of a dry break coupler to an adapter while minimizing undue wear or breakage of coupler components. According to one aspect of the invention, a dry break coupler or the like comprises a coupler body, a latching mechanism for holding the coupler body to another component, a telescoping sleeve moveable axially on the coupler body to engage and disengage the latching mechanism, and a sleeve operator assembly for moving the telescoping sleeve axially between engaged and disengaged positions. The sleeve operator assembly includes a yoke having opposite ends and opposite side portions straddling the telescoping sleeve. The opposite side portions of the yoke are connected to respective sides of the telescoping sleeve at diametrically opposite connection points. A handle is provided at one end of the yoke, and provision is made for constraining movement of the yoke at the other end of the yoke.

In a preferred embodiment of the invention the yoke includes a ring collar which surrounds the telescoping sleeve and which is connected to the telescoping sleeve at the connection points for relative pivotal movement. The collar and telescoping sleeve are circular and concentric, and a linkage connects the yoke at its end opposite the handle to the coupler body. In use, the handle may be urged forwardly and rearwardly to move the locking sleeve with uniform application of force at opposite sides of the locking sleeve. The handle may also be used to assist in maneuvering the dry break coupler.

According to another aspect of the invention, there is provided a kit for retrofitting a quick disconnect coupler such as a dry break coupler including a coupler body, a latching mechanism for holding the coupler to another component, and a telescoping sleeve moveable axially on the coupler body to engage and disengage the latching mechanism. The kit comprises a yoke having opposite ends and opposite side portions for straddling the telescoping sleeve, means for connecting the opposite side portions of the yoke to respective sides of the telescoping sleeve at diametrically opposite connection points, a handle at one of the opposite ends of the yoke, and constraining means attachable to the coupler body for constraining movement of the yoke at the other of the opposite ends of the yoke.

According to a further aspect of the invention, there is provided a method for retrofitting a quick disconnect coupler including a coupler body, a latching mechanism for holding the coupler to another component, and a telescoping sleeve moveable axially on the coupler body to engage and disengage the latching mechanism and which telescoping sleeve has handles at diametrically opposite sides thereof. The method comprises the steps of removing the handles from the telescoping sleeve to provide diametrically opposite mounting points; connecting a yoke having opposite ends and opposite side portions to the telescoping sleeve, the side portions straddling the telescoping sleeve and being connected to respective sides of the telescoping sleeve at the diametrically opposite mounting points, and the yoke having a handle at one end; and constraining movement of the yoke at the other end of the yoke.

The foregoing and other features of the invention are hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION

Figure 1:
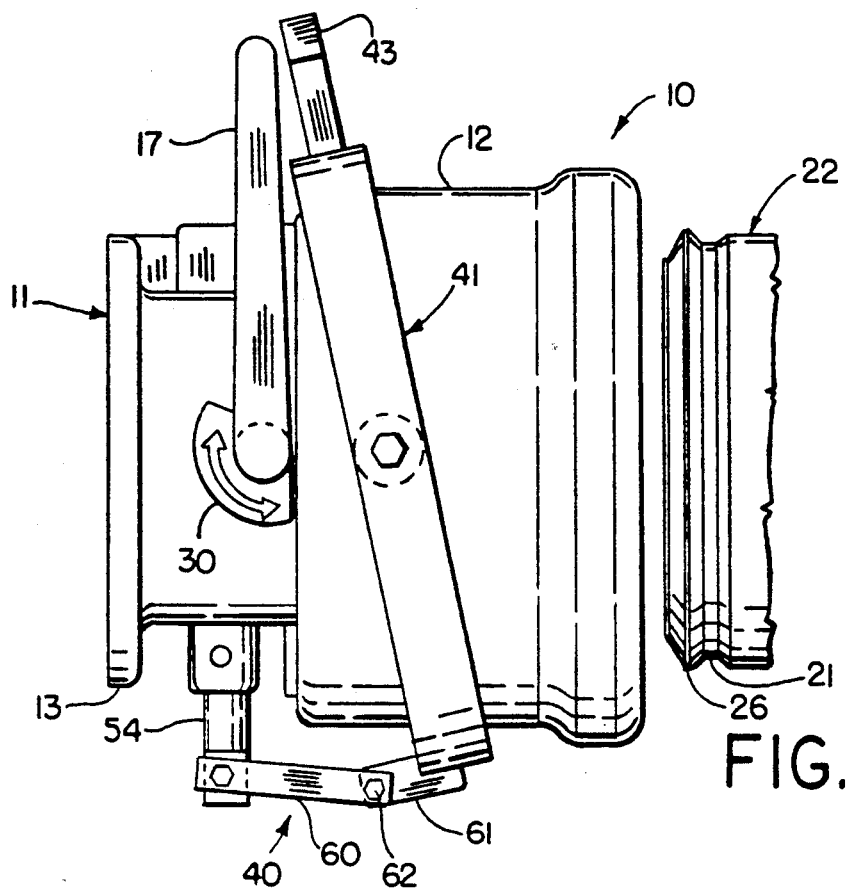
FIG. 1 is a side elevational view of an improved dry break coupler embodying the present invention, shown in axially spaced relation to an adapter (only a fragment shown) to which it may be coupled.
Figure 2:
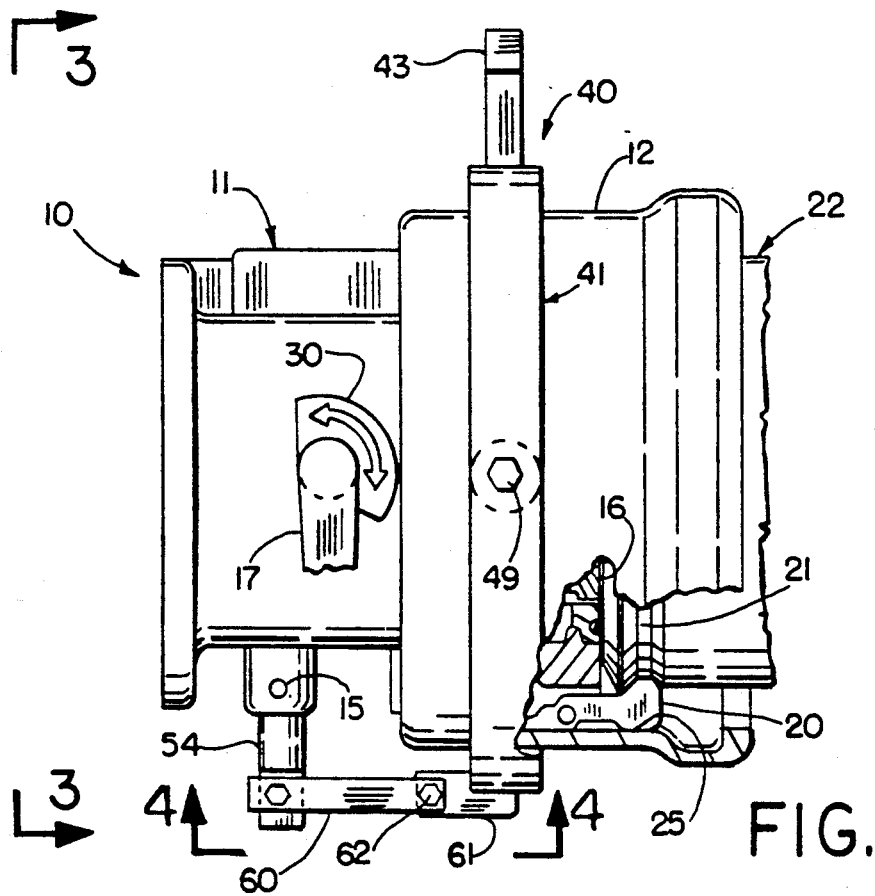
FIG. 2 is a side elevational view showing the dry break coupler coupled to the adapter, a part of which is broken away to show a portion of the latching mechanism.
Figure 3:
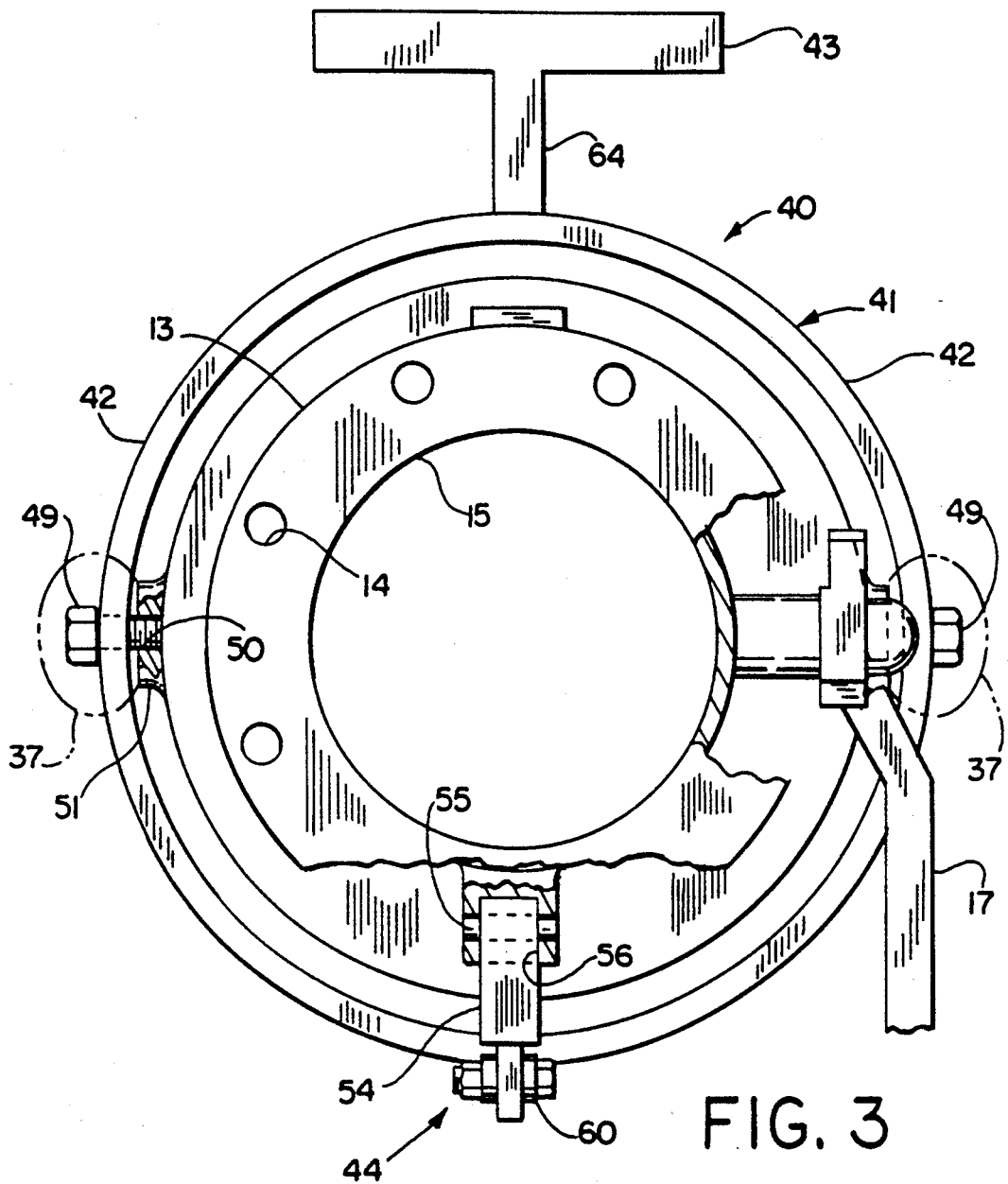
FIG. 3 is an rear end elevational view of the dry break coupler looking from the line 3—3 of FIG. 2, some parts having been removed or broken away for illustration purposes.

Referring now in detail to the drawings and initially to FIGS. 1-3, a dry break coupler embodying the present invention is indicated generally by reference numeral 10. The dry break coupler generally comprises a valve body 11 and a locking sleeve 12 telescoped over the valve body for limited axial sliding movement. The valve body, also herein referred to as a coupler body, has a rear mounting flange 13 for mounting to a fluid transfer component (not shown) such as a loading arm. As seen in FIG. 3, the mounting flange, provided with a circumferential arrangement of bolt holes 14, circumscribes a fluid passage 15. The fluid passage 15 extends axially forwardly through the valve body to a poppet valve 16. The poppet valve is moved axially between open and closed positions by a lever 17. In FIG. 1 the lever is shown in its closed position corresponding to the closed position of the poppet valve. In FIG. 2 the lever is shown rotated 180 degrees to its open position corresponding to the open position of the poppet valve which permits fluid to flow through the valve body.

The dry break coupler 10 further comprises a plurality of latching lugs or dogs, only one of which is shown at 20 in FIG. 2. The latching dogs are circumferentially arranged around the front end of the valve body for engaging in an annular groove 21 of an adapter 22. Although not shown, the adapter would normally be mounted to another fluid transfer component such as a bottom loading pipe on the bottom of a tank truck.

Each latching dog 20 is connected at a pivot 24 to the valve body 11 for swinging movement in a radial direction to permit insertion of the nose end of the adapter therebetween. In FIG. 2 the nose end of the adapter is shown fully inserted into the dry break coupler and the latching dog 20 is shown engaged in the annular groove 21. The latching dog is held engaged in the annular groove by an annular inner surface 25 of the locking sleeve 12. The locking sleeve surface 25 engages the radially outer side of the head of the latching dog to prevent the latching dog from moving radially out of the annular groove and clear of the annular wall 26 over which the latching dog hooks. In this manner the dry break coupler is securely coupled to the adapter.

When the locking sleeve 12 is in its engaged or forwardly extended position shown in FIG. 2, the poppet valve lever 17 can be rotated to its open position to open the poppet valve for establishment of fluid communication between the valve passage 15 and a flow passage in the adapter 22. The flow passage of the adapter may be normally closed by a spring biased check valve (not shown) which is forced open by the poppet valve when the latter is opened. When the lever is in its open position, a cam 30 is positioned to prevent the locking sleeve from moving rearwardly, i.e., to the left in FIG. 2, relative to the valve body 11, thereby to prevent inadvertent disengagement of the latching dogs when the poppet valve is open for fluid flow through the coupler. In the illustrated coupler the cam 30 is formed integrally with the lever 17.

The dry break coupler 10 can be decoupled from the adapter 22 by rotating the poppet valve lever 17 from its open position in FIG. 2 to its closed position in FIG. 1. This will close the poppet valve 16 and also will rotate the cam 30 clear of the locking sleeve 12 to permit retraction of the locking sleeve to its disengaged position in FIG. 1. When the locking sleeve is in its retracted or disengaged position, the locking sleeve surface 25 no longer will be radially aligned with the heads of the latching dogs. Instead, the heads of the latching dogs will be free to pivot radially outwardly into an annular recess 35 in the sleeve that will then be radially aligned with the heads of the latching dogs. The recess is sufficiently deep to permit pivoting of each latching dog to a position that will radially clear the adapter wall 26 to permit separation of the dry break coupler and adapter.

To the extent thus far described, the illustrated dry break coupler 10 is of conventional construction and operation. More particularly, the illustrated dry break coupler is a Model J0451 dry break coupler manufactured by Emco Wheaton Inc., Conneaut, Ohio, that has been modified in accordance with the present invention in the below described manner. This prior art coupler heretofore has been used at the end of a loading arm for connection to a bottom loading adapter on a tank truck. An operator would typically manually maneuver the dry break coupler into alignment with the adapter at the bottom of the truck and then push the coupler into mating engagement with the adapter. Once mated, the locking sleeve would be pushed forwardly from its disengaged to its engaged position. To facilitate this pushing of the locking sleeve, the Model J0451 dry break coupler has a pair of handles at diametrically opposite sides of the locking sleeve, as indicated in phantom lines at 37 in FIG. 3. An operator could grip these handles and push preferably with equal force against the handles to push the sleeve to its engaged position without cocking of sleeve. As above mentioned, problems arise when an operator attempts to push the locking sleeve to its engaged position when the dry break coupler is not properly aligned with and mated with the adapter. To overcome these problems and to facilitate coupling of the dry break coupler to the adapter, a locking sleeve operator assembly is provided in accordance with the invention.

The locking sleeve operator assembly, indicated generally at 40 in FIGS. 1-3, comprises a yoke in the form of a ring collar 41. Although preferably circular, the yoke or collar 41 can be viewed as having a pair of legs or leg portions 42 which straddle the locking sleeve at opposite sides 43. At one end the legs are connected to a handle. At their opposite end the legs are connected to the valve body 11 by constraining means in the form of a linkage assembly 44. In the illustrated embodiment the legs are formed by respective side halves of the collar and thus are joined together at their ends. The collar circumscribes the locking sleeve and has an inner diameter great enough to permit pivoting of the collar relative to the locking sleeve in the below described manner.

The collar 41 is pivotally connected at the legs 42 thereof to diametrically opposite sides of the locking sleeve 12 by shoulder bolts 49. The shoulder bolts are secured in threaded bores 50 (FIG. 3) provided in the sides of the locking sleeve and preferably have unthreaded shank portions on which the collar pivots. As will be appreciated, a prior art dry break coupler may be easily retrofitted with the yoke collar by machining off the handles 37 provided at diametrically opposite sides of the locking sleeve. Preferably a portion of each handle stem 51 is left to provide a thickened side wall into which the bore 50 may be drilled and tapped.

At its lower end the collar 41 is connected to the valve body by the linkage assembly 44. The linkage assembly includes an extension member 54 fixed to and extending radially outwardly from the valve body. The extension member has a round end secured by a roll pin 55 in a bore 56 in the valve body. In the aforesaid Model J0451, the bore 56 is an existing bore provided to mount an optional handle to the valve body.

Figure 4:
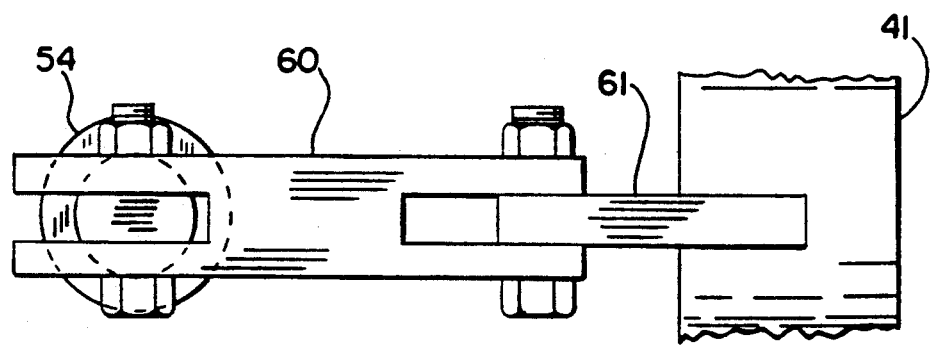
FIG. 4 is a bottom view of a linkage assembly employed in the dry break coupler according to the invention, looking from the line 4—4 of FIG. 2.

The linkage assembly 44 further includes a connecting link 60 pivotally connected at one end to the outer end of extension member 54 and at its other end to a lug bracket 61 fixed to the bottom end of the collar 41 diametrically opposite the handle 43. The pivot connection 62 between the bracket and connecting link forms a moving fulcrum point about which the collar can pivot. Pivoting of the collar can be effected by an operator grasping and moving the handle forwardly and rearwardly, i.e., left and right in FIGS. 1 and 2. As seen in FIG. 4, the ends of the connecting link may be slotted for receipt of the collar bracket 61 and a flat end tab portion 63 of the extension member.

The handle 43 may have the illustrated or other desired shape. Preferably the stem 64 of the handle is attached to the collar 41 centrally with respect to the collar pivots 49 and diametrically opposite the fulcrum point 62. The handle also extends radially outwardly from the collar along a line perpendicular to the pivot axis of the collar. That is, the handle, collar and linkage assembly preferably are symmetrical with respect to the sleeve diameter perpendicular to the pivot axis of the collar.

In use, the collar 41 will normally be in the rearwardly rotated position shown in FIG. 1 for permitting coupling of the dry break coupler 10 to the adapter 22. In this position the locking sleeve 12 will be in its retracted disengaged position permitting such coupling. In addition, the locking sleeve will normally be held in this position by an internal interlock in the dry break coupler (existing in the Model J0451) that prevents forward movement of the locking sleeve until the adapter 22 is inserted into the dry break coupler sufficiently to disengage that interlock. Consequently, the handle may be used to facilitate manuevering of the dry break coupler into alignment with the adapter and then pushing of the coupler into mating engagement with the adapter.

As the coupler moves into mating engagement with the adapter, the above-mentioned locking sleeve interlock will be disengaged thereby freeing the locking sleeve for forward movement to its engaged position. Such movement is effected by an operator pushing forwardly on the handle 43 of the operator assembly 40. The axial force applied to the handle will be evenly transferred to diametrically opposite sides of the collar for forward translation of the locking sleeve. Moreover, the force applied at each pivot connection 49 to the locking sleeve will in the illustrated embodiment be greater than the force applied to the handle as a result of the mechanical advantage afforded by the locking sleeve operator assembly.

As the handle 43 is pushed forwardly by an operator, the collar 41 will rotate to its position shown in FIG. 2 and this will cause the locking sleeve to move forwardly to its engaged position shown in FIG. 2, thereby securely to couple the dry break coupler to the adapter. At this time the poppet valve lever 17 may be turned to its FIG. 2 position to open the poppet valve 16. To decouple the dry break coupler and adapter, the poppet valve lever is turned back to its FIG. 1 position and then the handle 43 is pulled rearwardly to retract the locking sleeve. After the locking sleeve has been fully retracted to its FIG. 1 position, further rearward pulling on the handle will pull the dry break coupler away from the adapter.

As is apparent from the foregoing, existing dry break couplers may be relatively easily retrofitted with the locking sleeve operator assembly in the above desired manner, and to this end retrofit kits including the operator assembly components may be provided.

What is claimed is:

1. A quick disconnect coupler comprising a coupler body, latching means for holding said coupler body to another component, a telescoping sleeve moveable axially on said coupler body to engage and disengage said latching means, and sleeve operator means for moving said telescoping sleeve axially between engaged and disengaged positions, said sleeve operator means including a yoke having opposite ends and opposite side portions straddling and surrounding said telescoping sleeve, means connecting said opposite side portions of said yoke to respective sides of said telescoping sleeve at diametrically opposite connection points, a handle at one of said opposite ends of said yoke, and constraining means for constraining movement of said yoke at the other of said opposite ends of said yoke.

2. A coupler as set forth in claim 1, wherein said yoke is connected to said telescoping sleeve at said opposite connection points for relative pivotal movement.

3. A coupler as set forth in claim 2, wherein said yoke includes a collar surrounding said telescoping sleeve.

4. A coupler as set forth in claim 3, wherein said collar and telescoping sleeve are circular and concentric.

5. A coupler as set forth in claim 3, wherein said constraining means includes linkage means connecting said yoke to said coupler body.

6. A coupler as set forth in claim 1, wherein said yoke includes a collar surrounding said telescoping sleeve.

7. A coupler as set forth in claim 1, wherein said constraining means includes linkage means connecting said yoke to said coupler body.

8. A kit for retrofitting a quick disconnect coupler including a coupler body, latching means for holding the coupler body to another component, and a telescoping sleeve moveable axially on the coupler body to engage and disengage the latching means, the kit comprising a yoke having opposite ends and opposite side portions for straddling and surrounding the telescoping sleeve, means for connecting said opposite side portions of said yoke to respective sides of the telescoping sleeve at diametrically opposite connection points, a handle at one of said opposite ends of said yoke, and constraining means attachable to the coupler body for constraining movement of said yoke at the other of said opposite ends of said yoke.

9. A kit as set forth in claim 8, wherein said means for connecting includes pivot connectors.

10. A kit as set forth in claim 9, wherein said yoke includes a collar for surrounding the telescoping sleeve.

11. A kit as set forth in claim 10, wherein said constraining means includes linkage means for connecting said yoke to the coupler body.

12. A kit as set forth in claim 8, wherein said yoke includes a collar for surrounding the telescoping sleeve.

13. A kit as set forth in claim 8, wherein said constraining means includes linkage means for connecting said yoke to the coupler body.

14. A method for retrofitting a quick disconnect coupler including a coupler body, latching means for holding the coupler body to another component, and a telescoping sleeve moveable axially on the coupler body to engage and disengage the latching means and having handles at diametrically opposite sides thereof, the method comprising the steps of removing the handles from the telescoping sleeve to provide diametrically opposite mounting points, connecting a yoke having opposite ends and opposite side portions to the telescoping sleeve, the side portions straddling and surrounding the telescoping sleeve and being connected to respective sides of the telescoping sleeve at the diametrically opposite mounting points, the yoke having a handle at one of the opposite ends of the yoke, and constraining movement of said yoke at the other of said opposite ends of said yoke.

* * * * *